United States Patent [19]

Bashaw et al.

[11] 3,983,095

[45] Sept. 28, 1976

[54] ABSORBENT FIBERS AND PROCESS FOR THEIR PREPARATION

[75] Inventors: Robert Niles Bashaw; Bobby Leroy Atkins, both of Lake Jackson, Tex.

[73] Assignee: The Dow Chemical Company, Midland, Mich.

[22] Filed: Feb. 12, 1973

[21] Appl. No.: 331,849

[52] U.S. Cl................................... 526/15; 8/130.1; 128/156; 128/284; 264/205
[51] Int. Cl.² ......................................... C08F 8/44
[58] Field of Search ............... 260/78.5 T; 264/205

[56] References Cited
UNITED STATES PATENTS

| | | | |
|---|---|---|---|
| 3,085,986 | 4/1963 | Muskat | 260/31.8 |
| 3,398,092 | 8/1968 | Fields et al. | 210/24 |
| 3,642,726 | 2/1972 | Heilman | 260/78.5 T |
| 3,678,016 | 7/1972 | Zimmerman et al. | 260/78.4 D |
| 3,810,468 | 5/1974 | Harper | 128/156 |

FOREIGN PATENTS OR APPLICATIONS 856,320  12/1960  United Kingdom ............ 260/78.5 T

*Primary Examiner*—John Kight, III
*Attorney, Agent, or Firm*—Richard W. Hummer

[57] ABSTRACT

Water-insoluble, water-swellable fibers adapted to bind aqueous fluids such as body exudates are prepared by spinning fibers from an organic solvent solution of a copolymer of maleic anhydride with suitable vinyl monomers. The copolymer solution also contains a small amount of a polyfunctional cross-linking agent such as a glycol or alkylene diamine which reacts to cross-link the copolymer chains when the fibers are heated and dried. The cross-linked copolymer fibers are then rendered hydrophilic and water-swellable by reaction with ammonia or an alkali metal hydroxide.

19 Claims, No Drawings

ABSORBENT FIBERS AND PROCESS FOR THEIR PREPARATION

BACKGROUND OF THE INVENTION

It has previously been proposed to prepare highly swelling polymers from unsaturated carboxylic compounds such as maleic anhydride by polymerizing the carboxylic monomer with a cross-linking agent such as a polyethylenically unsaturated compound as shown in U.S. Pat. No. 2,798,053 and references cited therein. Such polymers have been employed as synthetic gums to produce mucilaginous or gel-like aqueous compositions.

It has further been suggested to employ solid linear copolymers of maleic anhydride and styrene in admixture with a substantial proportion of polyhydric alcohol, as for example in U.S. Pat. No. 3,085,986, to produce thermoset molded resins wherein the final product is cross-linked by reaction of the polyhydric alcohol with the anhydride residues in the linear polymer. The products from this latter procedure are hard resins which absorb only minimal amounts of water or sodium chloride solution even after immersion therein for 7 days.

It has recently been suggested, for example in British Pat. No. 1,200,106, that certain lightly cross-linked polymers containing a plurality of hydrophilic units can advantageously be employed to absorb and bind body fluids. Such polymers, typically lightly cross-linked, partially hydrolyzed polyacrylamides, are recommended as constituents of the filler of disposable diapers, bed pads and other such sanitary products by reason of their ability to hold substantially more aqueous fluid under pressure than can be held by an equal weight of cellulosic fluff or the like. However, in certain applications of such highly water-swellable polymers, difficulties have been encountered in confining the polymer after it becomes engorged with aqueous fluid.

It would be desirable to have a highly water-swellable water-insoluble polymer in fiber form. Such a material would lend itself to incorporation in woven or nonwoven fabrics either alone or together with conventional synthetic or natural fibers. Such a material could also be handled by conventional mechanical devices for fabricating disposable diapers and the like. Further, such water-swellable fibers could be more easily confined in a sanitary product either when dry or when engorged with aqueous fluid. However, when water-swellable polymers are prepared in the usual fashion by incorporating the cross-linking agent during the polymerization reaction by which said polymer is formed, the resulting cross-linked polymer product generally cannot be fabricated into fibers or filaments by conventional methods.

SUMMARY OF THE INVENTION

In accordance with the present invention there is provided a water-insoluble, water-swellable derivative of a copolymer of maleic anhydride with at least one suitable vinyl monomer in novel fiber form. The invention further provides a novel method for preparing lightly cross-linked, ammonium or alkali metal salt derivatives of such vinyl monomer-maleic anhydride copolymers in fiber form.

In carrying out the invention, a copolymer of maleic anhydride with any suitable vinyl monomer such as ethylene, propylene, isobutylene, methyl vinyl ether, styrene, vinyl toluene, t-butylstyrene or the like is dissolved in an organic solvent together with a small amount of a cross-linking agent and the resulting solution is forced through a die or spinnerette to produce filamentous fibers of the copolymer. Various conventional spinning techniques may be employed. For example, the solution of copolymer may be wet spun be extrusion into a coagulation bath containing a liquid which is a nonsolvent for the copolymer. Alternatively, and particularly where the copolymer is desired in monofilament form, a dry spinning technique may be employed wherein the solution of copolymer is extruded in filamentous form into air or other gas. In any case, following the fiber spinning step the copolymer fibers are heated for a period of time at somewhat elevated temperatures, for example, from about 50° to about 100°C. to dry the fibers and to complete the reaction of the cross-linking agent with the copolymer. Good results with respect to stability of gel capacity of the fibers have been obtained by employing a curing time of from about 12 to 24 hours at a temperature of about 100°C.

In preparing the fibers, it is essential that spinning be accomplished as soon as possible after the cross-linking agent has been introduced into the spinning solution since proper fibers cannot be obtained if the cross-linking reaction has proceeded to any substantial degree. Allowable holding or processing time after admixture of the cross-linker will vary depending on the reactivity of the cross-linking agent used. Thus when a glycol or polyglycol is the cross-linking agent spinning of fibers should be completed within several hours after addition of said agent to the solution of copolymer. On the other hand because of the speed of the cross-linking reaction with diamines, such as trimethylene diamine, the latter must be mixed with the copolymer solution in the spinnerette assembly and the resulting mixture be spun into fibers immediately.

Following completion of the cross-linking reaction, the copolymer fibers are treated with ammonia or an alkali metal hydroxide to open the anhydride rings in the copolymer and convert same to a hydrophilic salt form. In one convenient mode of operation, the cross-linked fibers are cooled and immersed in liquid ammonia at atmospheric pressure. Alternatively, the cross-linked fibers are placed in an autoclave or other suitable pressure vessel maintained at a temperature below 20°C. and treated with gaseous ammonia under a pressure of from about 20 to 100 pounds per square inch (gauge). In another mode of operation, the cross-linked fibers are immersed in a solution of an alkali metal hydroxide in an anhydrous alkanol such as ethanol for a period of time to complete the salt forming reaction. In a preferred method of forming the alkali metal salts, the cross-linked fibers are first reacted with gaseous ammonia and the resulting product is thereafter immersed in the solution of alkali metal hydroxide in anhydrous alcohol or in an aqueous solution of alkali metal hydroxide containing a sufficient concentration of the latter to prevent any substantial swelling of the fibers. In the latter operation, good results have been obtained when employing an aqueous 50% by weight solution of sodium hydroxide. Following any of these treatments with alkaline agents, the fibers may be washed free of excess alkaline material with a suitable solvent such as anhydrous methanol, ethanol or the like.

The copolymer starting materials employed in the present invention are prepared in known procedures employing free-radical initiating polymerization catalysts such as organic peroxides. Typical methods and reaction conditions are shown, for example, in U.S. Pat. Nos. 2,872,436, 3,423,355 and 3,423,373. Similar procedures are shown in *Encyclopedia of Polymer Science and Technology*, Volume 1, pages 80–84 (1964). Thus, for example, equimolar proportions of maleic anhydride and a suitable copolymerizable vinyl monomer are dissolved in an inert organic solvent such as acetone, methylethyl ketone, methylene chloride or benzene and a small effective amount of a peroxide catalyst such as tertiary butyl peroxypivalate is added after the monomer solution has been purged free of dissolved inhibitory oxygen by sparging with an inert gas such as nitrogen. The temperature of the reaction mixture is then raised to a reaction temperature of about 40°–50°C. and the reaction mixture is maintained at such temperature under a blanket of inert gas for a period of time to complete the polymerization reaction. It is desirable to adjust the reaction conditions to produce copolymers having molecular weights of at least about 50,000 and molecular weights of 100,000 or more are desirable. Preferred copolymers which can be readily spun into strong fibers have molecular weights of 1,000,000 or greater. When the reaction solvent is also a solvent for the copolymer product as is the case with acetone and methylethyl ketone, the product is obtained as a viscous solution of the copolymer in the ketone solvent and as such, with at most an adjustment of concentration by addition or removal of solvent, can be used directly as a fiber spinning solution with the mere addition of the desired quantity of a suitable cross-linking agent. On the other hand, when using benzene or methylene chloride as a reaction solvent in which the copolymer product is insoluble, the copolymer precipitates from the reaction medium and can be separated, for example, by filtration or decantation, and dried. Such copolymer products can then be dissolved as desired in a suitable spinning solvent for carrying out the further fiber forming and cross-linking operations.

As shown in the above references, a variety of vinyl monomers are suitable for copolymerizing with maleic anhydride to produce the copolymer starting materials. In general, any vinyl monomer which forms linear copolymers with maleic anhydride can be employed provided such monomers do not contain reactive groups which react unfavorably with the anhydride portion of the maleic anhydride. Such vinyl monomers include olefins such as ethylene, propylene and isobutylene, vinyl aromatic compounds such as styrene and tertiary butylstyrene, olefinic acids such as acrylic and methacrylic acid, unsaturated amides such as acrylamide and methacrylamide, and other vinyl compounds such as vinyl methyl ether, vinyl methyl ketone, vinyl-pyrrolidone, vinyl alkanoates and the like. For the present purposes, the copolymers of styrene or isobutylene with maleic anhydride are preferred and copolymers of vinyl-pyrrolidone or acrylic acid with maleic anhydride are of special interest for certain applications. Such copolymers of maleic anhydride with a single comonomer are generally prepared with approximately equimolar proportions of the comonomers.

While the foregoing has been directed primarily to copolymers of maleic anhydride with a single vinyl monomer, it will be apparent that two or more suitable vinyl monomers can be employed with the maleic anhydride to produce copolymer starting materials which are, in fact, terpolymers, tetrapolymers or the like. Good results with respect to terpolymers have been obtained by copolymerizing maleic anhydride with styrene containing a minor proportion of vinyl-pyrrolidone, acrylonitrile or an alkyl acrylate or methacrylate such as isobutyl acrylate or 2-ethylhexyl acrylate. In preparing such terpolymers, it is preferred to employ equimolar proportions of styrene and maleic anhydride with up to about 0.2 molar proportion of the third ingredient, that is, for each mole of maleic anhydride there is employed one mole of styrene and about 0.2 mole of auxiliary vinyl monomer.

The cross-linking agents suitable for use in preparing the polymer fibers are polyfunctional organic compounds in which the functional groups are adapted to react readily with carboxylic acid anhydrides. Representative cross-linking agents include polyols, amino alcohols and polyamino compounds. Amino phenols may also be employed. It should be noted that polyamino compounds react so rapidly with the anhydride groups in the copolymer starting materials that fiber spinning must take place immediately after mixing the polyamino compound with the copolymer solution. For ease of handling and subsequent processing during fiber forming, the polyol compounds are preferred cross-linking agents. Good results have been obtained in employing ethylene glycol, diethylene glycol, tetraethylene glycol, 1,5-pentanediol and 2-butyne-1,4-diol. Of these, diethylene glycol is particularly preferred. Orthoamino phenol has also proved effective as a cross-linking agent. The amount of cross-linking agent can be varied somewhat depending upon the gel capacity desired in the finished fibers provided only that sufficient cross-linking agent is employed to render the polymer fibers water-insoluble. In general, a cross-linking agent is added to the spinning solution of copolymer in the amount of from about 0.25 to about 15% by weight, preferably from about 0.5 to about 2% by weight, based on the weight of copolymer present.

The term "gel capacity" as employed in the present specification and claims is defined as the weight in grams of the swollen fibers which have imbibed an aqueous fluid to equilibrium capacity divided by the weight in grams of the dry polymer fibers employed.

Conventional equipment and methods for spinning fibers can be employed. In practice, the starting copolymer can be prepared in a spinning solvent such as acetone of methylethyl ketone employing proportions of monomers to solvent such that the resulting viscous solution of copolymer can be mixed with the appropriate amount of cross-linking agent and employed directly as a spinning solution. Alternatively, dry solid copolymer can be dissolved in a suitable solvent together with a cross-linking agent and employed for spinning fibers. Suitable solvents should dissolve a substantial amount of the copolymer, for example, from about 10 to about 50% by weight or more thereof and should also either be sufficiently volatile to be readily removed by evaporation from the fibers in dry spinning or should be soluble in the fluid employed as a coagulation bath for wet spinning. Suitable solvents include acetone, methylethyl ketone, N-methyl pyrrolidone and dimethylformamide. The concentration of copolymer employed in the spinning solution will vary depending on the nature of the solvent and the composition and molecular weight of the copolymer. It is important that the spinning solution have the proper viscosity for use in the extrusion equipment employed and the necessary concentration of copolymer to achieve the desired viscosity can readily be ascertained by a few preliminary tests over a range of concentrations. With low molecular weight copolymers concentrations of up to 40 or 50% by weight in acetone have been employed to obtain the desired fiber-forming solution. Conversely with high molecular weight copolymers, for example with molecular weights of one million or more concentrations as low as 10% by weight of copolymer in acetone have proved suitable.

In dry spinning, the solution of copolymer and cross-linking agent is extruded through a suitable die into a current of warm air or other gas whereby the solvent is evaporated and the fibers are obtained in the form of monofilaments. For wet spinning, the solution of copolymer and cross-linking agent are forced through a suitable spinnerette into a coagulation bath which sets the fibers. Water is a preferred liquid for use in the coagulation bath although any other inert liquid which is a nonsolvent for the copolymer may be employed. Good fiber formation has been obtained employing a chlorinated hydrocarbon such as methylene chloride or an aliphatic hydrocarbon such as pentane as the coagulating bath liquid. Good fibers have been obtained by extrusion into coagulation baths maintained at room temperature or somewhat lower, that is at temperatures of from about 15° to about 25°C.

Once the fibers have been formed, they may be stretched, and/or twisted or crimped in conventional fashion depending upon the ultimate use proposed therefor. Stretching is conveniently accomplished by transferring the freshly formed fibers from the coagulation bath directly into a water bath at a temperature of about 90°C. and applying stretching tension by adjusting the speed of take-up rolls or the like. Following any such conditioning steps, the fibers are conveniently taken up on rolls, dried and heated for a period of time to complete the cross-linking reaction. Thereafter the fibers are treated with ammonia or alkali metal hydroxide or both in the manner set forth above to convert same to the salt form and thereby provide the desired property of water swellability.

The finished water-insoluble, water-swellable fibers are adapted to a variety of uses. For example, the fibers can be woven into filter cloths and employed to remove small amounts of water dispersed in liquid hydrocarbons. Primarily, the fibers are used in the fabrication of absorbent layers for sanitary products such as bed pads, diapers, sanitary napkins and the like. Such layers can be in the form of woven or nonwoven fabrics, air-laid fibers or a mixture of said fibers with cellulosic fluff or the like. In such use, the water-swellable fibers can absorb and bind many times their weight of a body fluid or exudate and hold same against the pressures encountered in normal use. For such purposes the water-swellable fibers are superior to the cellulosic fluff or wadding commonly employed in such sanitary products.

While the above description has been directed to the preparation of fibers and filaments, it will be apparent that the same steps of (1) forming a solution of copolymer and cross-linking agent, (2) extruding said solution into a shaped form, (3) curing the shaped material at an elevated temperature and (4) reacting the cured product with ammonia and/or an alkali metal hydroxide can be employed with a mere change in design of the extrusion equipment to produce water-swellable polymer in the form of films or thin sheets or strips. The only limitation on the extruded shape is the requirement that at least one dimension be sufficiently small to provide for efficient penetration of the salt-forming reactant in the final step. Thus, it is desirable that such articles in film or sheet form should not exceed about 200 mils in thickness.

The following examples illustrate the invention but are not to be construed as limiting.

EXAMPLE 1

100.6 Grams of maleic anhydride and 109.4 grams of styrene were dissolved in 600 grams of acetone in a 1-liter resin kettle equipped with thermometer, stirrer, gas inlet and reflux condenser. The resulting solution was purged with nitrogen gas for 30 minutes with stirring and 0.6 milliliter of tertiary-butyl peroxypivalate was then added as catalyst while the temperature of the solution was raised to 40°C. to initiate the polymerization reaction. The temperature was maintained at about 40°C. for a period of about 16 hours to complete the reaction and the copolymer product was recovered in the form of a viscous solution in acetone. A similar product is obtained by substituting methylethyl ketone for the acetone above.

EXAMPLE 2

Employing the apparatus and following the general procedure of Example 1, 37.5 grams of maleic anhydride and 40 grams of styrene were dissolved in 1260 grams of methylene chloride and the solution purged with nitrogen for about 35 minutes. One milliliter of tertiary-butyl peroxypivalate was added to the solution and the mixture was heated to a temperature of about 40°C. and so maintained. As the polymerization reaction proceeded, copolymer precipitated from the mixture and after a period of about 20 hours the copolymer product was recovered by filtration and drying.

EXAMPLE 3

The procedure of Example 1 was followed employing a charge of 100.6 grams of maleic anhydride, 109.4 grams of styrene and 23.6 grams of N-vinylpyrrolidone dissolved in 600 grams of methylethyl ketone. After purging with nitrogen, polymerization was initiated by addition of 1.4 milliliters of tertiary-butyl peroxypivalate and heating to about 40°C. at which temperature the reaction mixture was maintained for about 20 hours to complete the reaction and to obtain the terpolymer product as a solution in methylethyl ketone. Similar polymers were prepared by substituting acrylonitrile or 2-ethyl-hexyl acrylate for the N-vinylpyrrolidone.

EXAMPLE 4

The procedure of Example 3 was repeated except that 23.6 grams of isobutyl acrylate was substituted for the N-vinylpyrrolidone and the reaction was carried out in 700 grams of acetone as solvent, using 0.72 milliliter of tertiary butyl peroxypivalate as catalyst. The terpolymer product recovered as a solution in acetone was found to have a molecular weight of about 310,000 by gel permeation chromatography.

EXAMPLE 5

A. copolymer Preparation

258 Grams of maleic anhydride was dissolved in 1752 grams of acetone in a 3-liter resin kettle, fitted with thermometer, condenser, stirrer and nitrogen-purge line, and 272 grams of styrene was added thereto. The resulting solution was purged with nitrogen for about 30 minutes and immediately thereafter about 1.5 grams of tertiary butyl peroxypivalate catalyst was added and the temperature brought to 40°C. and held constant. When the reaction mixture became viscous, the stirring and nitrogen purge were discontinued and the mixture was maintained at 40°C. for about 20 hours to obtain the desired styrene-maleic anhydride copolymer product as a solution in acetone containing about 25 percent by weight of copolymer solids and having a viscosity of about 50,000 centipoises. A portion of this solution was employed for a molecular weight determination by gel permeation chromatography and the copolymer was found to have a molecular weight of about 125,000.

B. Fiber Spinning and Cross-linking

About 300 grams of the copolymer solution, prepared in accordance with Paragraph A above, was mixed with sufficient diethylene glycol to provide about 0.5 percent by weight of diethylene glycol based on the weight of copolymer solids in the solution and the resulting solution was extruded into a bath of water at 20°C. through a spinnerette under a constant pressure of about 60 pounds per square inch. The spinnerette had 15 orifices each 0.003 inch in diameter and 0.003 inch thick. The extruded solution formed fibers in the water bath. The resulting fibers were transferred via rolls at a rate of 18 feet per minute to a further bath of water at 90°C. and stretched therein about 375 percent. The stretched fibers were transferred by rolls at a rate of about 67 feet per minute through a level wind onto a motor-driven roll. The resulting tow measured about 10.3 denier per filament and each filament had a breaking tenacity of about 0.88 grams per denier. The roll of fibers was heated at a temperature of 50°C. for two hours to complete the cross-linking reaction with the diethylene glycol.

C. Salt Formation

Cross-linked fibers, produced in accordance with Paragraph B above, were placed in a pressure vessel and treated with gaseous ammonia at a pressre of 25 pounds per square inch (gauge) for a period of 20 hours. The resulting fibers in an ammonium salt form were found to be highly swellable in aqueous media and were determined to have a gel capacity of 600 grams per gram in deionized water and of 51 grams per gram in aqueous 0.27 normal sodium chloride solution.

A further portion of the fibers, produced as in Paragraph B above was immersed in 150 milliliters of a 1.67 molar solution of sodium hydroxide in anhydrous ethanol for a period of 16 hours. The resulting fibers in the sodium salt form were washed twice with methanol and thereafter once with hexane and then dried. The fibers so prepared were found to have a gel capacity of about 23 grams per gram in aqueous 0.27 normal sodium chloride solution. Similar water-swellable fibers are obtained by substituting potassium hydroxide for the sodium hydroxide in the foregoing.

EXAMPLE 6

Cross-linked styrene-maleic anhydride copolymer fibers were prepared essentially by the methods of Paragraphs A and B of Example 5 and separated into two substantialy identical portions wound on separate screen rolls. Both rolls were placed in a pressure vessel and maintained in an atmosphere of ammonia gas under a pressure of 20 pounds per square inch for 16 hours to react the ammonia with the acid anhydride rings of the polymer. One of said rolls of fiber was then reacted with sodium hydroxide dissolved in anhydrous ethanol for a period of 17 hours and thereafter washed with anhydrous methanol and dried. Just after preparation, each of the polymers had a gel capacity of about 46 grams/gram in 0.27 normal sodium chloride solution. Each of the resulting rolls of product was maintained in a flowing atmosphere of dry nitrogen at about room temperature for a period of 85 days. During this period, samples were taken from each roll at intervals and tested for gel capacity in 0.27 normal sodium chloride solution. The results are summarized in the following table wherein "Polymer A" represents the fibers treated with ammonia only, while "Polymer B" represents the fibers converted to the sodium salt form.

| Time, days | Gel Capacity in 0.27 N NaCl Solution | |
|---|---|---|
| | Polymer A | Polymer B |
| 5 | 31.5 | 46.3 |
| 11 | 23.1 | 45.5 |
| 32 | 15.4 | 44.7 |
| 85 | 13.6 | 47.1 |

It is apparent that the sodium salt form of the polymer fibers retains its gel capacity better than the fibers treated only with ammonia. A further preparation was carried out in exactly similar fashion to the above except that an aqueous 50% by weight sodium hydroxide solution was substituted for the ethanolic sodium hydroxide solution. a good fiber product having a similar high gel capacity was obtained.

EXAMPLE 7

A styrene-maleic anhydride copolymer prepared as in Example 2 was dissolved in acetone at a concentration of about 20% by weight to product a viscous stock solution. Portions of the stock solution were mixed with different cross-linking agents to prepare a series of spinning solutions each containing one of the cross-linking agents at a concentration of 0.5% by weight based on the weight of copolymer. Each such spinning solution was employed to spin fibers following the procedure of Paragraph B of Example 5. The resulting rolls of fiber were heated for 2 hours at about 50°C. and then cooled and treated with gaseous ammonia for 16 hours under 20 pounds per square inch pressure. The gel capacity in 0.27 N sodium chloride solution was then determined for each batch of fiber. The results are summarized in the following table.

| Cross-linking Agent Used | Gel Capacity of Product, g./g. |
|---|---|
| Tetraethylene glycol | 33 |
| 2-Butyne-1,4-diol | 36 |
| 1,5-pentanediol | 40 |

EXAMPLE 8

Following the general procedure of Example 2 equimolar proportions of isobutylene and maleic anhydride were copolymerized in a pressure reactor employing a peroxide catalyst to produce an isobutylene-maleic anhydride copolymer which was found to have a molecular weight of about 7,000,000. 9 Grams of said copolymer was dissolved in 41 grams of N-methylpyrrolidone and a solution of 0.09 gram of diethylene glycol in 4 grams of N-methylpyrrolidone was added thereto to produce a spinning dope containing 16.6% by weight of the copolymer and 1% by weight of said copolymer of the diethylene glycol cross-linking agent. when the solution was homogeneous, it was forced under a pressure of 70 pounds per square inch through a 15 hole spinnerette of 3 mil thickness into a coagulation bath of water at a temperature of 23°C. The resulting fiber was collected from the coagulation bath and placed in an oven at 105°C. for one hour to complete drying and solvent stripping from the fibers and to accomplish the cross-linking reaction. The fibers were then placed in a pressure vessel at room temperature and treated with gaseous ammonia at a pressure of 20 p.s.i. for 1 hour. The resulting fiber product was determined to have a gel capacity of 406 grams per gram in distilled water and 35 grams per gram in 0.27 N sodium chloride solution.

Highly water-swellable, water-insoluble fibers of good strength are also obtained when the foregoing preparation is repeated employing 2.5 percent by weight of the cross-linking agent (based on the weight of copolymer).

While we do not wish to be bound by any particular theory, it is believed that the reaction of ammonia with the anhydride copolymers produces a water-swellable product containing equimolar proportions of amide groups and ammonium salt groups while the reaction of alkali metal hydroxide with the copolymer converts each anhydride moiety to the disodium salt form.

We claim:

1. A method for the preparation of water-insoluble, water-swellable polymer products which comprises the steps of
    1. forming a solution, in an organic solvent, of a copolymer of maleic anhydride with a vinyl monomer copolymerizable therewith,
    2. adding to said solution from about 0.25 to 2.5 percent by weight, based on the weight of copolymer present, of a cross-linking agent consisting of a polyfunctional organic compound in which the functional groups are adapted to react with carboxylic acid anhydrides,
    3. extruding the solution of copolymer and cross-linking agent into a shaped form,
    4. drying and curing the resulting shaped form of copolymer at an elevated temperature of at least about 50°C. for a period of time sufficient to effectuate cross-linking of the copolymer, and
    5. reacting the resulting cured product with ammonia or an alkali metal hydroxide.

2. A water-insoluble, water-swellable polymer product prepared by the method of claim 1.

3. A method according to claim 1 wherein the cross-linking agent is employed in the amount of from about 0.5 to about 2 percent by weight based on the weight of copolymer present.

4. A method according to claim 1 wherein the vinyl monomer is an olefin, a vinyl aromatic compound, an olefinic acid, a vinyl ether or vinylpyrrolidone.

5. A method according to claim 1 wherein the cross-linking agent is an aliphatic polyol, an amino alcohol, an amino phenol or a polyamino compound.

6. A method according to claim 1 wherein the cured product is reacted with gaseous or liquid ammonia.

7. A method according to claim 1 wherein the cured product is reacted with a solution of alkali metal hydroxide in anhydrous alcohol or with an aqueous solution of alkali metal hydrodixe containing a sufficient concentration of said hydroxide to prevent substantial swelling of the polymer product.

8. A method according to claim 1 wherein the cured product is reacted successively with ammonia and then with an alkali metal hydroxide.

9. A method according to claim 1 wherein the solution of copolymer and cross-linking agent is extruded into a coagulation bath.

10. A method according to claim 9 wherein the coagulation bath liquid is water.

11. A method according to claim 4 wherein the vinyl monomer is styrene or isobutylene.

12. A method according to claim 11 wherein the cross-linkg agent is an aliphatic polyol.

13. A method according to claim 12 wherein the vinyl monomer is styrene and the cross-linking agent is diethylene glycol.

14. A method according to claim 12 wherein the vinyl monomer is isobutylene and the cross-linking agent is diethylene glycol.

15. As an article of manufacture a water-insoluble, water-swellable polymeric fiber composed of the ammonium or alkali metal salt form of a copolymer of maleic anhydride with a vinyl monomer copolymerizable therewith, said copolymer having been cross-linked by reaction with from about 0.25 to 2.5 percent by weight of the copolymer of a polyfunctional organic compound in which the functional groups are adapted to react with carboxylic acid anhydrides.

16. An article according to claim 15, wherein the copolymer is a copolymer of maleic anhydride and styrene cross-linked by reaction with an aliphatic polyol.

17. An article according to claim 16 wherein the aliphatic polyol is diethylene glycol.

18. An article according to claim 15 wherein the copolymer is a copolymer of maleic anhydride and isobutylene cross-linked by reaction with an aliphatic polyol.

19. An article according to claim 18 wherein the aliphatic polyol is diethylene glycol.

* * * * *